A. S. RAMAGE.
PROCESS OF PRODUCING TERPENE PEROXID.
APPLICATION FILED FEB. 7, 1903.
1,098,356.
Patented May 26, 1914.
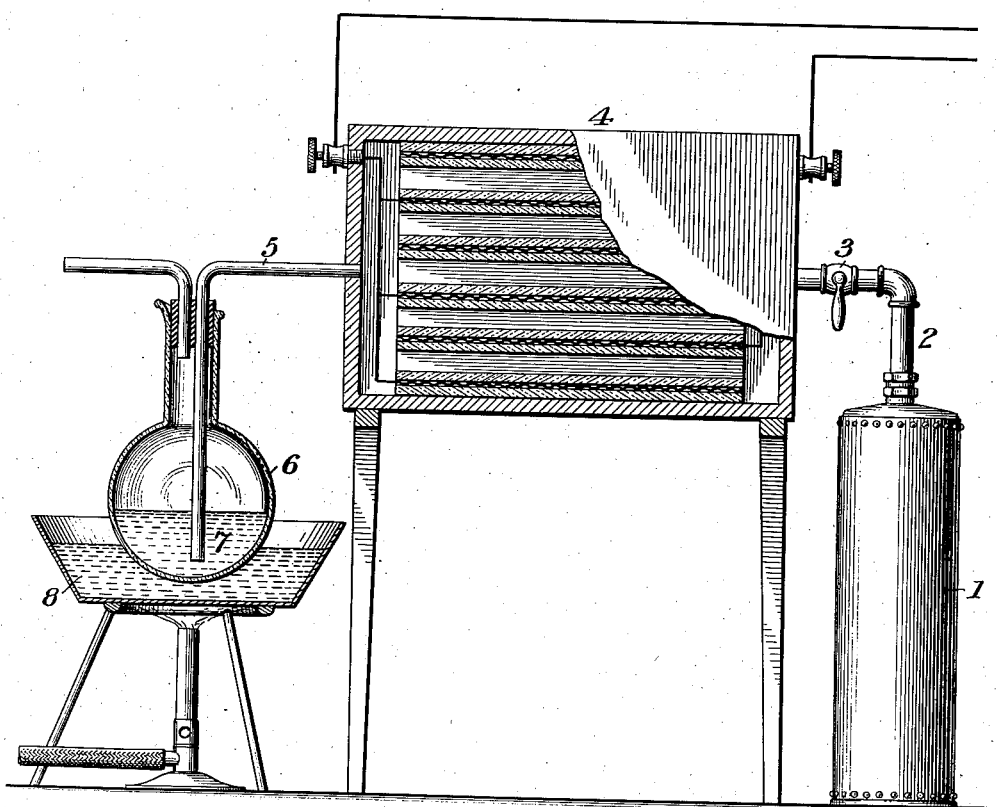
Witnesses:
Inventor:
Alexander S. Ramage,
By Byrnes & Townsend,
Attys.

UNITED STATES PATENT OFFICE.

ALEXANDER S. RAMAGE, OF CLEVELAND, OHIO, ASSIGNOR TO EUGENE A. BYRNES AND CLINTON PAUL TOWNSEND, CONSTITUTING THE FIRM OF BYRNES & TOWNSEND, OF WASHINGTON, DISTRICT OF COLUMBIA.

PROCESS OF PRODUCING TERPENE PEROXID.

1,098,356.    Specification of Letters Patent.    Patented May 26, 1914.

Application filed February 7, 1903. Serial No. 142,3€.

*To all whom it may concern:*

Be it known that I, ALEXANDER S. RAMAGE, a citizen of the United States, residing at Cleveland, in the county of Cuyahoga and State of Ohio, have invented certain new and useful Improvements in Processes of Producing Terpene Peroxid, of which the following is a specification.

I have discovered that when cineol or eucalyptol, is heated and brought into contact with an oxidizing agent of sufficient chemical activity, especially ozone or ozonized air, in the absence of water, the compound is oxidized and fumes of terpene peroxid are evolved, which may be collected in liquid form. The oxidizing agent may be brought into contact with the terpene body in different ways.

One form of apparatus for effecting this result is shown in the accompanying drawing, in which the figure is an elevation, partly in section.

The apparatus shown comprises means for supplying oxygen or air to the ozonizer, here shown as a tank of compressed oxygen or air 1, having an outlet-pipe 2, with control-valve 3, leading to the ozonizer 4. The ozonizer (shown in section) may be of any usual construction, such as that of my United States Patent No. 614,500. An outlet-pipe 5 leads from the ozonizer into and nearly to the bottom of a vessel 6, within which is placed a body 7 of the terpene body to be oxidized. The vessel 6 is heated, preferably to a temperature of about 60 degrees centigrade, during the operation, as by placing it in an oil-bath 8. As the ozone or ozonized air bubbles up through the liquid it carries with it dense white fumes of the terpene peroxid, which are then discharged from the vessel through outlet 9.

The fumes of the terpene peroxid may either be used as evolved, or be condensed into a liquid by reducing their temperature to 0 degrees centigrade. After ozonized air has been passed through the liquid for some time, the fumes of peroxid will cease to rise and a residue will be left in the vessel, constituting about fifty per cent. of the liquid introduced. This residue is a resinous mass, which may be utilized for the manufacture of varnish or converted into an antiseptic chewing-gum.

While any essential oil or terpene body containing a large percentage of cineol is suitable for use in carrying out the process, I have found it preferable to employ pure cineol. This cineol is preferably prepared from the oil of that species of *Eucalyptus* known as "*Globulus*," by first forming a phosphoric acid compound, which is crystalline, draining the crystals from the liquid, decomposing them with water, and thoroughly washing the product.

The effect of the heat and ozone upon the cineol is to convert it into a higher oxid, consisting, approximately, of carbon, 70.2 parts: hydrogen 10.4 parts; and oxygen, 19.4 parts. The proper chemical formula seems to be $C_{10}H_{18}O_2$. The product may be properly termed "camphoric peroxid," being a higher oxid of the camphor group. The product is miscible with absolute alcohol and hydrocarbons; but when brought into contact with water it gradually decomposes into a terpene and hydrogen peroxid. The product boils at about 160 degrees centigrade and its melting point is below −30 degrees centigrade. The index of refraction is +14 degrees 15 minutes. This terpene peroxid has remarkable antiseptic properties and is especially valuable for the treatment of diseases produced by micro-organisms. Diseased animal tissues and surfaces may be exposed to its action for an indefinite length of time without its occasioning irritation, or harmful effects, and it may be freely inhaled in advanced cases of tuberculosis. When the peroxid comes into contact with the diseased tissues, the moisture of the tissues causes the compound to split up, liberating hydrogen peroxid, which again splits up into nascent oxygen and water. The nascent oxygen destroys the micro-organisms in the tissues and at the same time the tissues are coated with the residual terpene. After the tissues become thus covered with the terpene, pure ozone may be directly applied to them without causing the irritation which customarily follows its use. The terpene peroxid may also be employed by spraying it into a room, thus charging the air with it. A patient may then remain in the room and breathe the atmosphere continuously without inconvenience. The peroxid may be used for various purposes requiring an active oxidizing agent, such as the oxidation of animal and vegetable nondrying oils, to produce drying oils therefrom.

In carrying out the process, the oxidizing agent may be passed through or merely brought in contact with the terpene body, the essential conditions being that the liquid shall be heated to a temperature above 38 degrees centigrade, and preferably to 60 degrees centigrade; that the oxidizing agent shall be of sufficient chemical activity to cause fumes of the peroxid to be evolved; and that water be absent, to prevent immediate decomposition of the nascent fumes. The new product of this process is claimed in my United States Patent, No. 710,893, granted Oct. 7, 1902.

I claim:

1. The process of producing terpene peroxid, which consists in reacting upon a terpene compound oxidizable to peroxid, with an oxidizing agent of sufficient chemical activity partially to oxidize said compound, the reaction being carried out in absence of water, at a temperature above 38° centigrade, and under conditions to drive off the terpene peroxid in the form of fumes.

2. The process of producing terpene peroxid, which consists in reacting upon a terpene hydrocarbon oxidizable to peroxid, with a gaseous oxidizing agent of sufficient chemical activity partially to oxidize said compound, the reaction being carried out in absence of water, at a temperature above 38° centigrade, and under conditions to drive off the terpene peroxid in the form of fumes.

3. The process of producing terpene peroxid, which consists in reacting upon a terpene compound oxidizable to peroxid with ozone or ozonized air, the reaction being carried out in absence of water, at a temperature above 38° centigrade, and under conditions to drive off the terpene peroxid in the form of fumes.

4. The process of producing terpene peroxid, which consists in passing through a terpene compound oxidizable to peroxid an oxidizing agent of sufficient chemical activity partially to oxidize said compound, the reaction being carried out in absence of water, at a temperature above 38° centigrade, and under conditions to drive off the terpene peroxid in the form of fumes.

5. The process of producing terpene peroxid, which consists in passing ozone or ozonized air through a terpene compound oxidizable to peroxid, the reaction being carried out in absence of water, at a temperature above 38° centigrade, and under conditions to drive off the terpene peroxid in the form of fumes.

6. The process of producing terpene peroxid, which consists in heating a terpene compound oxidizable to peroxid to a temperature above 38 degrees centigrade, bringing into contact with said heated compound, in the absence of water, a gaseous agent of sufficient chemical activity to oxidize the hydrocarbon, thereby causing fumes of the peroxid to be evolved and collecting the terpene peroxid in liquid form, as set forth.

7. The process of producing terpene peroxid, which consists in heating a terpene compound oxidizable to peroxid to a temperature above 38 degrees centigrade, bringing into contact with said heated compound, in the absence of water, ozone or ozonized air, thereby causing fumes of the peroxid to be evolved, and collecting the terpene peroxid in liquid form, as set forth.

8. The process of producing terpene peroxid, which consists in heating a material containing cineol to a temperature above 38 degrees centigrade, and bringing into contact with the heated cineol, in the absence of water, an oxidizing agent of sufficient chemical activity to oxidize the cineol and cause fumes of the peroxid to be evolved, as set forth.

9. The process of producing terpene peroxid, which consists in heating a material containing cineol to a temperature above 38 degrees centigrade, and bringing into contact with the heated cineol, in the absence of water, ozone or ozonized air, thereby causing fumes of the peroxid to be evolved, as set forth.

10. The process of producing terpene peroxid, which consists in heating a material containing cineol to a temperature above 38 degrees centigrade, and passing through the heated cineol, in the absence of water, ozone or ozonized air, thereby causing fumes of the peroxid to be evolved, as set forth.

11. The process of producing terpene peroxid, which consists in heating a material containing cineol to a temperature above 38 degrees centigrade, bringing into contact with the heated cineol, in the absence of water, an oxidizing agent of sufficient chemical activity to oxidize the cineol and cause fumes of the peroxid to be evolved, and collecting the terpene peroxid in liquid form, as set forth.

12. The process of producing terpene peroxid, which consists in heating a material containing cineol to a temperature above 38 degrees centigrade, passing through the heated cineol, in the absence of water, ozone or ozonized air, thereby causing fumes of the peroxid to be evolved, and collecting the terpene peroxid in liquid form, as set forth.

In testimony whereof I affix my signature in presence of two witnesses.

ALEXANDER S. RAMAGE.

Witnesses:
 FRED V. LAWRENCE,
 A. E. GILBERT.